J. C. MINISH.
FLEXIBLE SLED.
APPLICATION FILED MAY 25, 1912.
1,051,614.
Patented Jan. 28, 1913.
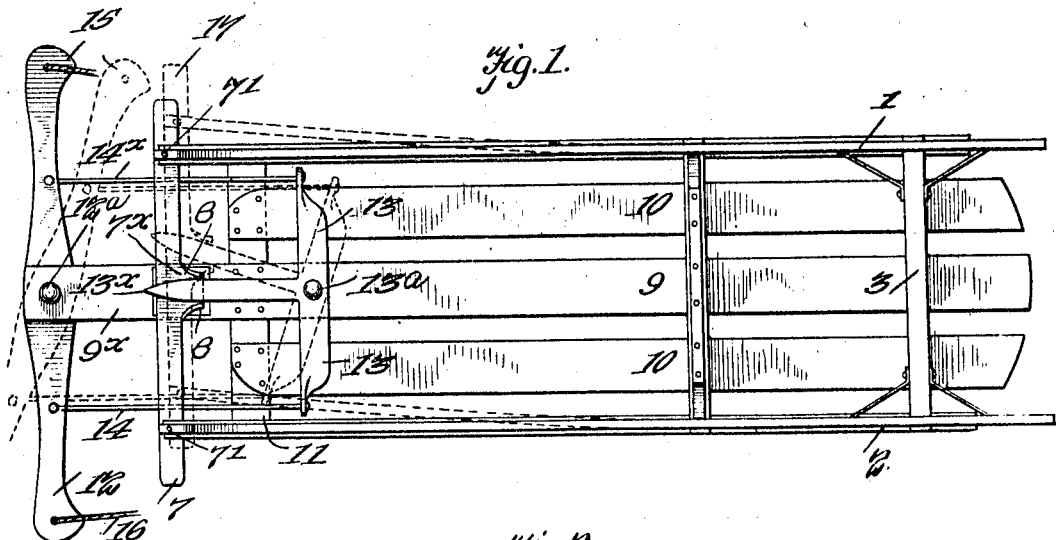
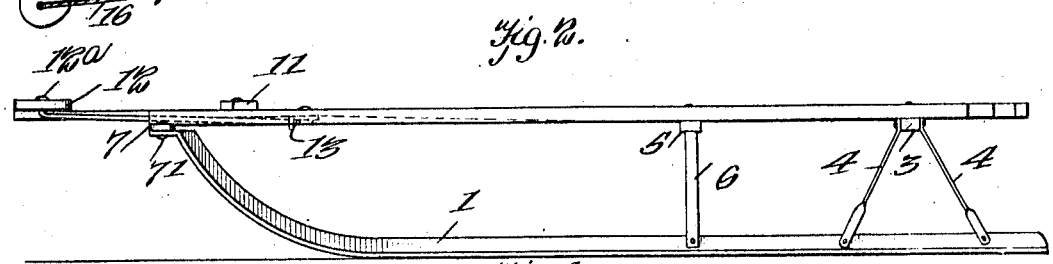
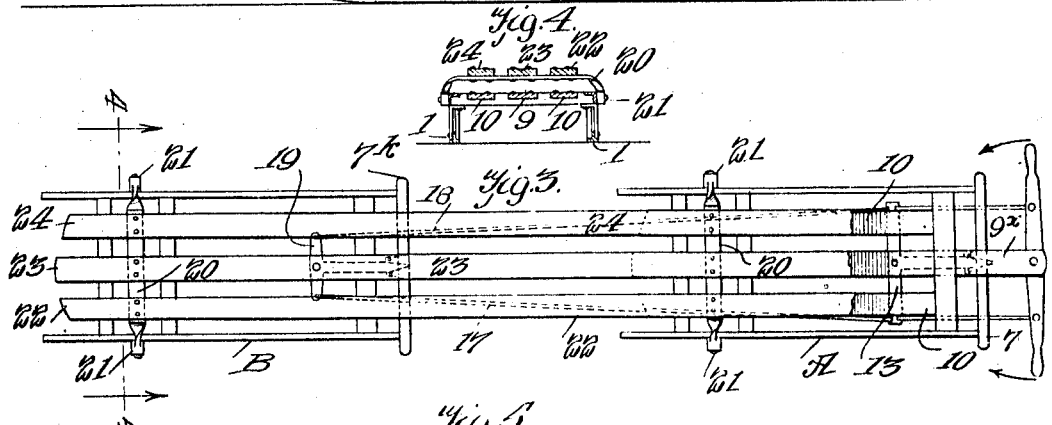
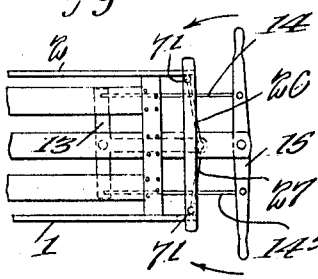
WITNESSES
E. W. Callaghan
L. H. Stanley
INVENTOR
JOHN C. MINISH,
BY Munn & Co.
ATTORNEYS

UNITED STATES PATENT OFFICE.

JOHN C. MINISH, OF RIDGWAY, PENNSYLVANIA.

FLEXIBLE SLED.

1,051,614.  Specification of Letters Patent.  Patented Jan. 28, 1913.

Application filed May 25, 1912. Serial No. 699,651.

*To all whom it may concern:*

Be it known that I, JOHN C. MINISH, a citizen of the United States, and a resident of Ridgway, in the county of Elk and State of Pennsylvania, have made certain new and useful Improvements in Flexible Sleds, of which the following is a specification.

My invention relates to improvements in flexible sleds, and it consists in the constructions, combinations, and arrangements herein described and claimed.

An object of my invention is to provide a device which is more easily manipulated than the ordinary flexible sled in that it has greater leverage upon the flexible runners.

A further object of my invention is to provide a simple device which costs no more than the ordinary sled for rendering my flexible sled more susceptible to guiding influences.

Other objects and advantages will appear in the following specification and the novel features of the device will be particularly pointed out in the appended claims.

My invention is illustrated in the accompanying drawings forming part of this application in which—

Figure 1 is a bottom view of the device showing the operating members. Fig. 2 is a side view. Fig. 3 is a top plan view showing the use of my improved sled with "bobs". Fig. 4 is a section along the line 4—4 of Fig. 3. and Fig. 5 is a view of a modified form of the device.

In carrying out my invention, I provide the runners 1 and 2 of the usual shape. At the rear end of the sled is a cross piece 3 to which the runners 1 and 2 are secured by means of braces 4. A second cross piece 5 may be provided having side pieces 6 extending therefrom to the runners. The front portion of the runners is curved upwardly as shown in Fig. 2 in the usual manner and is pivotally connected at 7' to a bar 7. This bar is provided with a lateral extension $7^x$ having curved flanges 8 as shown in Fig. 1.

In the illustration I have shown the sled as being provided with a central longitudinal board 9, which is secured to the cross pieces 3 and 5 in any suitable manner. The boards 9 and 10 are secured to a cross strip 11, the boards 10 terminating at this strip and the central board 9 extending on beyond, as shown at $9^x$. Pivotally mounted at $12^a$ on the upper part of the extension $9^x$ is a control lever 12. A T-shaped bell-crank lever 13 is pivotally mounted at $13^a$ on the under side of the member 9, and its central arm $13^x$ extends between the flanges 8 of the portion $7^x$ of the bar 7. The ends of the lever 13 are connected by means of links 14 and $14^x$ to the control lever.

From the foregoing description of the various parts of the device the operation thereof may be readily understood. When the control lever 12 is shifted into the position indicated in dotted lines in Fig. 1 the bell crank lever 13 is also shifted and the arm $13^x$ engages the curved flange 8 on one side, pushing the bar 7 laterally, and flexing the runners into the position shown in dotted lines. The control bar may be operated either by the feet or by cords 16 attached at the ends.

The advantage of such a construction may be readily seen. There is a considerable distance between the pivotal point $13^a$ of the bell-crank lever and the place where the arm $13^x$ engages the flanges 8 to shift the bar 7. The control lever 12 is set out in front of the runners, and this construction results in a greater movement of the flexible runners for a given movement of the control lever than the ordinary construction. Moreover, a sled of this kind has few operating parts, and these parts are not liable to get out of order. The sled can therefore be built cheaply.

In Figs. 3 and 4, I have shown the application of this sled to "bobs." In this figure there is a front sled A and a rear sled B. The front sled is provided with the extension $9^x$ and with a lever 12. It is also provided with the bell-crank lever 13, which is arranged to shift the bar 7 as already described. Extending from the bell-crank lever 13 rearwardly are two links 17 and 18, which are connected to a bell-crank lever 19, which operates a bar $7^k$ similar to the bar 7 of the front sled. The length of the arms of the bell-crank lever 19, and the points where the links 17 and 18 connect with the lever 19 are so proportioned that the flexing of the runners of the rear sled B will cause them to track with the runners of the front sled. In order to permit the rear sled to have a pivotal movement so as to accommodate itself to inequalities in the ground I provide a cross bar 20, which is bent downwardly at its ends, and is pivotally connected with the sides of the sled at 21. The boards 22, 23 and 24 are secured to the bars 20 of the front and rear sleds, as shown, to lie above the bottom boards 9 and 10, which form the longitudinal portions of the individual sleds, as shown in Fig. 4. With the construction thus described above, sleds of the bob may be steered simultaneously by manipulating the control lever 12 of the front of the sled.

In Fig. 5, I have shown a modified form of the device in which the arm 13× of the bell-crank lever is connected by means of links 26 and 27 to the pivot pins 7′, which pass through the bar 7 and through the runners 1 and 2. This has substantially the same effect as the construction shown in Fig. 1, in that it provides a steering device which will flex the runners to a considerable extent with a comparatively slight movement of the control lever 15.

I claim:—

1. In a flexible sled, a pair of flexible runners, cross pieces for securing said runners, a plurality of longitudinal members carried by said cross pieces, a bar secured at the forward ends of said runners, a control lever carried by the central one of said longitudinal members, a bell-crank lever pivotally mounted underneath said longitudinal members, and having an arm arranged to engage said bar for shifting the latter to flex the runners, and connections between said control lever and said bell-crank lever for operating the latter.

2. In a flexible sled, a pair of flexible runners, cross pieces for securing said runners, a plurality of longitudinal members carried by said cross pieces, a bar secured at the forward ends of said runners, a control lever carried by the central one of said longitudinal members, a T-shaped bell-crank lever pivotally mounted on the under part of the said central member, one arm of said bell-crank lever being arranged to engage said bar for flexing the runners, and a link connecting each of the other arms to the said controlling lever.

3. In a sled construction, a front and a rear sled, each comprising flexible runners, a bar connecting the ends of the runners of each sled, cross pieces for securing the runners, longitudinal members carried by said cross pieces, the front sled being provided with a control lever pivotally carried by one of said longitudinal members, a T-shaped bell-crank lever for each sled disposed underneath its central longitudinal member, the end of one of the arms of each of said levers being arranged to engage its respective bar for flexing the runners, links connecting said control lever with the crank lever of the front sled, and links connecting the bell-crank lever of the front sled with the bell-crank lever of the rear sled, the bell-crank lever of the rear sled having shorter arms than the bell-crank lever of the front sled.

4. In a flexible sled, a pair of flexible runners, cross pieces for securing said runners, a plurality of longitudinal members carried by said cross pieces, the central one of said longitudinal members being extended beyond the ends of the runners, a control lever pivotally mounted on said extended portion, a bell-crank lever pivotally mounted underneath the longitudinal members on the opposite side of said bar, said bell-crank lever having an arm arranged to engage said bar for shifting the latter to flex the runners, and connections between said control lever and said bell-crank lever for operating the latter.

5. In a flexible sled, a pair of flexible runners, cross pieces for securing said runners, a plurality of longitudinal members carried by said cross pieces, the central one of said longitudinal members being extended beyond the ends of the runners, a control lever pivotally mounted on said extended portion, a T-shaped bell-crank lever pivotally mounted underneath said longitudinal members, one arm of said T-shaped bell-crank lever being arranged to engage said bar for flexing the runners, and a link connecting each of the other arms to said control lever.

JOHN C. MINISH.

Witnesses:
J. H. Ross,
D. Merle Jenks.